Patented June 30, 1936

2,045,749

UNITED STATES PATENT OFFICE 2,045,749

PRODUCTION OF ALKYL PHENOLS FROM PETROLEUM HYDROCARBONS

Hyym E. Buc, Roselle, and Reuben Schuler, Elizabeth, N. J., assignors to Standard Oil Development Company, a corporation of Delaware No Drawing. Application June 16, 1932, Serial No. 617,604

20 Claims. (Cl. 260—154)

This invention relates to the production of alkyl phenols from petroleum hydrocarbons and more especially to the manufacture of secondary and tertiary alkyl phenols and other valuable compounds from unsaturated hydrocarbons formed in cracking petroleum oils.

By the methods herein described, compositions highly suitable for use as fungicides, disinfectants, germicides and for therapeutic purposes generally may be prepared by treating cracked petroleum fractions with phenols under suitable reaction conditions.

This invention will be fully understood from the following illustrative example:

Example 1

1200 cc. of a distillate boiling between 60 and 72° C. obtained from the naphtha produced in cracking a gas oil at 750 pounds per square inch pressure are mixed with 370 grams of phenol ($C_6H_5OH$). To this mixture 216 cc. of 95% sulfuric acid are added slowly with stirring and cooling to maintain the temperature of the mixture below about 60° C. When the addition of acid is completed the mixture is stirred at room temperature (without heating or cooling) for about 2 hours. It is then heated on a water bath to about 100° C. to remove the unreacted petroleum fraction. 900 cc. of a residue consisting largely of sulfonated alkyl phenolic compounds are thus obtained. This residue is diluted with water to obtain 1800 cc. of diluted mixture which contains about 38 grams of total sulfuric acid per 100 cc. of water. This mixture is then heated in a sealed autoclave at 180° C. for 2 hours to hydrolyze the sulfonated compounds. On cooling a top oily layer and a bottom acid layer separate. The oil layer is withdrawn and washed with water to remove acid. There are thus obtained 675 grams of a washed oily product representing a 98% yield based on the olefines in the petroleum fraction treated. 95% of this product is soluble in a 10% aqueous solution of sodium hydroxide and consists mainly of a mixture of secondary and tertiary hexyl phenols. The remaining 5% of alkali insoluble product is a mixture of corresponding hexyl phenyl ethers and possibly high boiling polymers of the original olefines. The alkyl phenols may be purified by distillation with steam or under vacuum, or by other suitable methods. The washed oily product may be distilled in vacuo. The fraction distilling below 150° C. at 1 mm. pressure consists almost completely of alkyl phenols. The residue is a viscous tarry mass, insoluble in alkali.

Other hydroxy aromatic compounds such as cresol, resorcinol, hydroquinone, pyrogallol and the like may be used instead of the phenol in the above example to produce corresponding alkylated phenolic derivatives.

This process may be used for the production of secondary and tertiary alkyl phenols from petroleum fractions containing olefines of more than 2 carbon atoms. The petroleum fractions containing olefines from propylene to octylene, inclusive, represent the preferred range for this process.

Products especially suitable for use as fungicides and containing isopropyl phenols and secondary and tertiary butyl and amyl phenols may be obtained from light cracked petroleum fractions having the boiling range of the corresponding hydrocarbons. For example, cracked petroleum fractions boiling between about −20 and +20° C., corresponding to the butane series of hydrocarbons, may be used to prepare a mixture of secondary and tertiary butyl phenols. This product is an exceptionally powerful fungicide. Products suitable for fungicidal use may generally be obtained with cracked petroleum fractions boiling within the range of about −60 and +50° C. Other fractions boiling within a narrower range such as +10 to +50° C., corresponding to the pentane series, may be used if desired. It is preferred in order to obtain satisfactory reaction rates to conduct the reaction of phenol and cracked petroleum fractions at sufficiently elevated pressure to maintain the petroleum fraction in liquid phase during the reaction. A temperature of about 50 to 80° C. is preferred for this reaction, although higher or lower temperatures may be used.

Products containing alkyl phenols preferred for therapeutic and germicidal uses are obtained from the higher boiling fractions. The fractions boiling between 60 and 72° C., and more broadly between about 40 and 110° C., are especially suitable for the preparation of powerful germicides. However, this invention is not to be limited to any particular boiling range of the petroleum fractions used, as those of still higher and lower boiling ranges may be used in the herein described processes for the production of valuable products.

The sulfonated alkyl phenolic derivatives prepared as described in the first reaction of the above example also represent a new and valuable product. These sulfonated reaction products are substantially completely water soluble and are valuable for use as water soluble germicides, wetting agents, emulsifiers, fungicides and oxidation inhibitors. These sulfonated reaction products may also be neutralized with an alkali to produce water soluble salts of similar characteristics.

The production of these mixed alkylated phenolic products directly from cracked petroleum fractions makes available products of especially desirable characteristics for many uses. For example, it is known that certain alkyl phenols are quite specific in germicidal action with regard to certain bacteria. Hexyl phenols appear to have maximum germicidal activity for *B. typhosus*, while heptyl and octyl phenols, of less germicidal value than hexyl phenol for this bacterium, are much more effective than hexyl phenol in killing *Staphylococcus aureus*. The mixed alkyl phenols prepared from petroleum are therefore suitable as a general germicide for a variety of bacteria. Similarly the crude butyl phenols prepared from cracked petroleum fractions contain both secondary and tertiary butyl phenols together with oily polymers and ethers, which also possess certain advantages when this product is used in horticultural sprays or wood impregnants.

The production of alkylated phenolic products directly from cracked petroleum fractions also permits marked savings in the cost and ease of preparation. Alkylated products are obtained in substantially theoretical yields based on both the olefines and phenols used. Products containing 90 to 95% of alkyl phenols are obtained with correspondingly decreased formation of alkyl aryl ethers which are less effective as fungicides and germicides and usually represent a substantial loss of the reagents used. The best yields obtainable by reaction of phenols with pure olefines are usually not greater than 50 or 60% and the products obtained contain not less than 40 to 50% of alkyl aryl ethers. In addition, such pure olefines are normally obtained by dehydration of alcohols which in turn are produced by the absorption of olefines from cracked gases with sulfuric acid. A loss of about 50% of the olefines to polymerized products accomplishes this sulfuric acid absorption process thereby further decreasing the overall yield of alkyl phenols. In our process all such losses are substantially completely avoided.

The process for preparing alkyl phenols shown in the above example is described in our co-pending application Ser. No. 617,603 filed June 16, 1932.

This invention is not to be limited however to this particular method of operation. The reaction may also be conducted according to the method described in United States application Ser. No. 522,177 filed March 12, 1931, by Hyym E. Buc, in which alkyl phenols are produced without substantial sulfonation of reagents or products.

Mixed phenols corresponding to the olefines present in light cracked petroleum fractions may also be prepared by reaction of a phenol with suitable sulfuric acid extracts of cracked petroleum gases and light distillates. Such extracts, known as reactive acid liquors, may contain substantially only propylenes; or butylenes and higher olefines; or propylenes and higher olefines, according to the concentration of sulfuric acid and the procedure used in extracting the olefines from the petroleum fractions according to the known art. For example, the phenol and acid liquor may be mixed and additional strong or fuming sulfuric acid may be added with cooling to bring the ratio of total sulfuric acid to water in the mixture within a suitable range for the formation of alkyl phenols, say above about 93% of sulfuric acid, based on acid and water present, and the process continued as described in the above examples. The acid liquors may also be hydrolyzed to yield secondary and tertiary alcohols corresponding to the olefines present. These alcohols may then be condensed with phenols to form the corresponding alkyl phenols by reaction in the presence of sulfuric acid or other suitable condensation agent according to the process described in co-pending application Serial Number 593,414, filed February 10, 1932 by Beamer.

The term "alkyl phenol" is used to designate a hydroxy aromatic such as phenol, cresol, resorcinol, hydroquinone, pyrogallol, naphthol and the like containing one or more alkyl groups attached to the aromatic ring. The product may contain alkyl phenols, alkyl aryl ethers, and mixed compounds having the characteristic radicals of both phenol and ether. The products are characterized by branched alkyl groups; that is, alkyl radicals containing a carbon atom attached to the aromatic radical, or to a connecting element such as oxygen, and to two or three carbon atoms in the alkyl group. Such compounds are classified as secondary or tertiary alkyl phenolic derivatives, respectively.

This invention is not to be limited to any examples or theories of the operation of our process, which have been presented solely for purpose of illustration, but only by the following claims in which we wish to claim all novelty.

We claim:

1. Germicidal composition containing in an effective germicidal concentration a mixture of alkyl phenols containing alkyl groups of more than 4 carbon atoms corresponding to the olefines of a petroleum fraction.

2. Germicidal composition containing in an effective germicidal concentration a mixture of alkyl phenols of more than 4 carbon atoms in the alkyl group prepared by reaction of a phenol with cracked petroleum olefines.

3. Germicidal and fungicidal composition containing in effective concentration a reaction product of a phenol with the olefines of a cracked petroleum fraction boiling within the range of $-60$ and $+50°$ C., said product including a mixture of alkyl phenols of more than 4 carbon atoms in the alkyl group of pronounced fungicidal activity.

4. Germicidal composition containing in an effective germicidal concentration a mixture of alkyl phenols produced by reaction of a phenol with the olefines of a cracked petroleum fraction boiling between about 60 and 72° C.

5. Germicidal composition containing in an effective germicidal concentration a mixture of alkyl phenols of pronounced germicidal activity comprising a reaction product of a phenol with the olefines of a cracked petroleum fraction boiling within the range of 40 to 110° C.

6. Germicidal composition containing in an effective germicidal concentration a product consisting of a mixture of alkyl phenols derived from cracked petroleum olefines and a phenol, said olefines comprising those of the amylene to octylene series, said product comprising secondary and tertiary alkyl phenols.

7. Germicidal composition containing in an effective germicidal concentration a product consisting of a mixture of alkyl phenols derived from cracked petroleum olefines and a phenol, said olefines comprising those of the amylene to octylene series, said product comprising secondary and tertiary alkyl phenols and a minor proportion of alkyl aryl ethers.

8. Composition of matter consisting of a water soluble mixture of sulfonated alkyl phenols obtained by reaction of the olefines of more than 4 carbon atoms in a cracked petroleum fraction with a phenol and sulfuric acid.

9. Composition of matter consisting of a water soluble mixture of salts of sulfonated alkyl phenols obtained by reaction of the olefines in a cracked petroleum fraction with a phenol, and sulfuric acid.

10. Process for preparing alkyl phenols comprising reacting a phenol with a petroleum fraction containing unsaturated hydrocarbons.

11. Process for preparing alkyl phenols comprising reacting a phenol with a cracked petroleum fraction in the presence of strong sulfuric acid.

12. Process for obtaining valuable derivatives from phenols comprising bringing a mixture of a phenol and a liquid cracked petroleum fraction containing unsaturated hydrocarbons of more than 2 carbon atoms into reaction in the presence of strong sulfuric acid and forming a reaction product comprising sulfonated alkyl phenolic derivatives.

13. Process for obtaining valuable derivatives from phenols comprising bringing a mixture of a phenol and a cracked petroleum fraction containing unsaturated hydrocarbons of more than 2 carbon atoms into reaction in the presence of strong sulfuric acid and forming a reaction product comprising sulfonated alkyl phenolic derivatives, and subsequently converting said sulfonated phenolic derivatives into the corresponding salts by neutralization with an alkali.

14. Process for obtaining valuable derivatives from phenols comprising bringing a mixture of a phenol and a liquid cracked petroleum fraction containing unsaturated hydrocarbons of more than 2 carbon atoms into reaction in the presence of strong sulfuric acid and forming a reaction product comprising sulfonated alkyl phenolic derivatives, and subsequently converting said sulfonated alkyl phenolic derivatives into the corresponding alkyl phenolic derivatives and sulfuric acid.

15. Process according to claim 14 in which said sulfuric acid is of less than 100% strength.

16. Process according to claim 14 in which the sulfonated alkyl phenolic derivatives are converted into the corresponding alkyl phenolic derivatives by hydrolysis.

17. Composition of matter consisting largely of a mixture of alkyl phenols derived from cracked petroleum olefines and a phenol, said olefines corresponding to those of a cracked petroleum fraction boiling over a range of at least 12° on the centigrade scale and being within the amylene to octylene series.

18. Germicidal composition containing in an effective germicidal concentration a mixture of alkyl phenols having an alkyl phenol with five to eight carbon atoms in said alkyl group.

19. Process for preparing alkylated phenolic bodies which comprises reacting a phenol with a cracked petroleum fraction which predominately contains hydrocarbons of four carbon atoms to the molecule.

20. Process for preparing alkyl phenols which comprises reacting a phenol with a cracked petroleum fraction which contains predominately hydrocarbons of four carbon atoms to the molecule and which also contains tertiary butylene in the presence of a mineral acid condensing agent.

HYYM E. BUC.
REUBEN SCHULER.

DISCLAIMER

2,045,749.—*Hyym E. Buc*, Roselle, N. J., and *Reuben Schuler*, Elizabeth, N. J. PRODUCTION OF ALKYL PHENOLS FROM PETROLEUM HYDROCARBONS. Patent dated June 30, 1936. Disclaimer filed April 3, 1940, by the assignee, *Standard Oil Development Company*.

Hereby disclaims from the scope of claim 18 of said Letters Patent any mixture of alkyl phenols except mixtures which contain two different alkyl phenol molecules in which an alkyl group of one of the said alkyl phenol molecules differs from any alkyl group in the other of said alkyl phenol molecules either in the total number of carbon atoms in each of the alkyl groups or in the number of carbon atoms connected to the carbon atom in each alkyl group joining it to the phenolic group.

[*Official Gazette April 23, 1940.*]